Patented Nov. 13, 1945

2,388,866

UNITED STATES PATENT OFFICE 2,388,866

LEAD GLASS COMPOSITION

John H. Partridge, Pinner, England, assignor to General Electric Company, a corporation of New York No Drawing. Application January 29, 1944, Serial No. 520,325. In Great Britain November 5, 1942

3 Claims. (Cl. 106—53)

This invention relates to glasses of the type containing both lead and alkali metals and resembling in their working and electrical properties the lead glasses widely used in the manufacture of electric lamps. The characteristic merit of glasses of this type is that they combine ease of working with high electrical resistivity; they usually contain some 30 per cent of lead oxide.

I have now found that the presence of strontium oxide makes it possible to reduce the content of lead oxide. According to the invention, therefore, a glass of the type specified contains at least 2 per cent of strontium oxide and not more than 20 per cent of lead oxide.

It does not appear possible to replace the lead oxide removed wholly by strontium oxide; the substituents for lead preferably include some or all of the oxides of barium, magnesium, boron, and titanium as well as strontium oxide. The strontium oxide also makes it possible to reduce the content of potassium oxide. However, again it does not appear possible by the introduction of strontium oxide both to reduce the potassium oxide content to not more than 3 per cent, and to reduce the lead oxide content to not more than 20 per cent.

Two glasses according to the invention will now be described by way of example with reference to the following table. The upper rows give the composition of the glasses. In the lower rows, $\alpha$ is the coefficient of linear expansive per °C. over the range 20° to 350° C., $\theta_3$, $\theta_4$, $\theta_7$, are respectively the temperatures in °C. at which the viscosity of the glass is $10^3$, $10^4$, $10^7$ poise. The working range is $\theta_4$–$\theta_7$. $\rho_{150}$ $\rho_{200}$ are respectively the resistivities in ohm cm. at 150° C. and 200° C. The column headed I refers to a known glass of the type specified; the columns headed II and III refer to the two glasses according to the invention.

It will be noted that the resistivity of these three glasses is somewhat higher than that of many of the lead glasses that are widely used. The lower proportion of lead makes them also less liable to "scum" during founding, and suitable for founding in a tank.

What I claim as new and desire to secure by Letters Patent of the United States is:

1. I lead glass having approximately the following composition:

| | Per cent |
|---|---|
| SiO₂ | 58.8 |
| PbO | 19.9 |
| Al₂O₃ | 0.74 |
| BaO | 2.88 |
| SrO | 2.52 |
| MgO | 1.23 |
| B₂O₃ | 1.00 |
| Na₂O | 5.9 |
| K₂O | 7.2 |

2. A lead glass having approximately the following composition:

| | Per cent |
|---|---|
| SiO₂ | 57.6 |
| PbO | 9.3 |
| Al₂O₃ | 0.88 |
| BaO | 2.68 |
| SrO | 7.81 |
| MgO | 4.35 |
| Na₂O | 8.58 |
| K₂O | 5.86 |
| TiO₂ | 9.5 |

3. A glass of the type described, characterized by ease of working combined with high electrical resistivity, containing the usual components of the lead glasses used in electric lamps, including SiO₂ as the major component and substantial proportions of PbO and alkali metal oxides, and characterized by the presence of the oxides of Sr, Ba and Mg, the SrO being present in an amount of at least 2%, together with an amount of PbO less than 20%.

JOHN H. PARTRIDGE.

Table

| | I | II | III |
|---|---|---|---|
| SiO₂ | 54.6 | 58.8 | 57.6 |
| PbO | 30.2 | 19.9 | 9.3 |
| Al₂O₃ | 0.8 | 0.74 | 0.88 |
| BaO | | 2.88 | 2.68 |
| SrO | | 2.52 | 7.81 |
| MgO | | 1.23 | 4.35 |
| B₂O₃ | 0.2 | 1.00 | |
| Na₂O | 5.1 | 5.9 | 8.58 |
| K₂O | 7.2 | 7.2 | 5.86 |
| TiO₂ | | | 9.5 |
| $\alpha \times 10^6$ | 9.2 | 9.0 | 9.5 |
| $\theta_3$ | 1,215 | 1,175 | 1,160 |
| $\theta_4$ | 980 | 995 | 980 |
| $\theta_7$ | 685 | 710 | 720 |
| Working range | 295 | 285 | 260 |
| $\log_{10} \rho_{150}$ | 12.0 | 12.6 | 12.0 |
| $\log_{10} \rho_{200}$ | 10.8 | 11.2 | 10.8 |